(12) United States Patent
Chi et al.

(10) Patent No.: US 10,559,270 B2
(45) Date of Patent: Feb. 11, 2020

(54) ARRAY SUBSTRATE AND DISPLAY PANEL

(71) Applicant: AU OPTRONICS CORPORATION, Hsin-chu (TW)

(72) Inventors: Yu-Min Chi, Hsin-chu (TW); Sung-Yu Su, Hsin-chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 15/828,912

(22) Filed: Dec. 1, 2017

(65) Prior Publication Data

US 2018/0366076 A1 Dec. 20, 2018

(30) Foreign Application Priority Data

Jun. 20, 2017 (TW) .............................. 106120579 A

(51) Int. Cl.
*G09G 3/36* (2006.01)
*G02F 1/1362* (2006.01)
*G02F 1/1343* (2006.01)

(52) U.S. Cl.
CPC ..... *G09G 3/3614* (2013.01); *G02F 1/134309* (2013.01); *G02F 1/136286* (2013.01);
(Continued)

(58) Field of Classification Search
CPC ............... G09G 3/3614; G09G 3/3655; G09G 2300/0443; G02F 1/134309; G02F 1/136286; G02F 2201/52
(Continued)

(56) References Cited

U.S. PATENT DOCUMENTS

| 7,471,274 B2 | 12/2008 | Kim |
| 10,288,925 B2 | 5/2019 | Lee et al. |

(Continued)

FOREIGN PATENT DOCUMENTS

| CN | 202189199 U | 4/2012 |
| CN | 102456334 A | 5/2012 |

(Continued)

OTHER PUBLICATIONS

Office Action issued by (TIPO) Intellectual Property Office, Ministry of Economic Affairs, R. O. C. dated Jan. 15, 2018 for Application No. 106120579 Taiwan.
(Continued)

*Primary Examiner* — Jennifer Mehmood
*Assistant Examiner* — Ngan T Pham Lu
(74) *Attorney, Agent, or Firm* — Tim Tingkang Xia, Esq.; Locke Lord LLP

(57) ABSTRACT

An array substrate includes three first conductive lines, three second conductive lines, and four switches. The three first conductive lines are sequentially and consecutively arranged along a direction, and the three second conductive lines are sequentially and consecutively arranged along another direction and intersect the first conductive lines. The four switches are respectively connected to the corresponding first conductive lines and the corresponding second conductive lines. Two of the switches are connected to the second one of the first conductive lines and are substantially located between two adjacent second conductive lines, and the other two of the switches are not connected to the second one of the first conductive lines and are substantially located between the other two adjacent second conductive lines.

3 Claims, 7 Drawing Sheets

(52) U.S. Cl.
CPC ....... *G09G 3/3655* (2013.01); *G02F 2201/52* (2013.01); *G09G 2300/0443* (2013.01)

(58) Field of Classification Search
USPC .......................................................... 345/88
See application file for complete search history.

(56) References Cited

U.S. PATENT DOCUMENTS

| | | | | |
|---|---|---|---|---|
| 2011/0007257 | A1* | 1/2011 | Min | G02F 1/136286 349/150 |
| 2012/0105494 | A1* | 5/2012 | Lee | G09G 3/3614 345/690 |
| 2012/0194573 | A1* | 8/2012 | Yamashita | G09G 3/3614 345/690 |
| 2013/0044281 | A1* | 2/2013 | Zhou | G02F 1/136286 349/73 |
| 2015/0205160 | A1* | 7/2015 | Kim | G02F 1/133512 349/42 |
| 2016/0172385 | A1* | 6/2016 | Noumi | H01L 27/124 257/72 |
| 2016/0203798 | A1* | 7/2016 | Peng | G09G 3/3696 345/206 |
| 2017/0146853 | A1* | 5/2017 | Lee | G02F 1/13439 |

FOREIGN PATENT DOCUMENTS

| | | |
|---|---|---|
| CN | 105093599 A | 11/2015 |
| CN | 106125428 A | 11/2016 |
| CN | 106802519 A | 6/2017 |
| TW | 201218177 A | 5/2012 |
| TW | I574093 B | 3/2017 |

OTHER PUBLICATIONS

Office Action issued by the State Intellectual Property Office of the Peoples Republic of China dated Sep. 16, 2019 for Application No. CN201710903322.0.

* cited by examiner

ARRAY SUBSTRATE AND DISPLAY PANEL

CROSS-REFERENCE TO RELATED PATENT APPLICATION

This application claims priority to and the benefit of, pursuant to 35 U.S.C. § 119(a), patent application Serial No. 106120579 filed in Taiwan on Jun. 20, 2017. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to a display device, and in particular, to an array substrate and a display panel having a pixel unit with an increased aperture ratio.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Liquid crystal display panels have advantages of being light, thin, short, small, and energy saving, and therefore are widely applied to various electronic products such as a smart phone, a notebook computer, a tablet personal computer (PC), and a flat-screen television, among various other types of consumer electronic products.

A liquid crystal display panel mainly includes an array substrate, an opposite substrate, and a display medium layer such as a liquid crystal material disposed between the two substrates. The array substrate includes elements such as a scan line, a data line, a switch element, and a pixel electrode, so as to form a plurality of sub-pixels. Because some of the elements of the substrates are usually made of a nontransparent material such as a metal material, the arrangement manner of the elements and transparent pixel electrodes affects that of the light-shielding patterns (black matrix, BM for example) and further affects a pixel aperture ratio of a display panel.

Therefore, as image resolution of liquid crystal display panels increases, when the size of a pixel unit is reduced, how to increase an aperture ratio of a pixel unit in a display panel and an array substrate by changing the configuration and design of elements in the pixel unit without affecting a display function is currently a major topic in the industry of display panels.

SUMMARY

At least one embodiment of the present invention provides an array substrate and a display panel, in which a pixel unit can provide a relatively high aperture ratio as image resolution increases.

An array substrate provided in at least one embodiment of the present invention comprises: three first conductive lines, three second conductive lines, and four switches. The three first conductive lines are sequentially and consecutively arranged along a direction, and the three second conductive lines are sequentially and consecutively arranged along another direction and intersect the first conductive lines. The four switches are respectively connected to the corresponding first conductive lines and the corresponding second conductive lines. Two of the switches are connected to the second one of the first conductive lines and are substantially located between two adjacent second conductive lines, and the other two of the switches are not connected to the second one of the first conductive lines and are substantially located between the other two adjacent second conductive lines.

In an embodiment, the first conductive lines are a first scan line, a second scan line, and a third scan line that are consecutively arranged, the direction is a first direction, the second conductive lines are a first data line, a second data line, and a third data line that are consecutively arranged, the another direction is a second direction, and the second direction is different from the first direction.

In an embodiment, the array substrate is driven in a dot inversion manner.

In an embodiment, the two of the switches correspond to two sub-pixels used to display a first color, the other two of the switches correspond to other two sub-pixels used to display a second color, and the first color is different from the second color.

In an embodiment, the two of the switches respectively correspond to two sub-pixels used to display different colors, and the other two of the switches respectively correspond to other two sub-pixels used to display different colors.

In an embodiment, the array substrate is driven in a row inversion manner.

In an embodiment, the two of the switches respectively correspond to two sub-pixels used to display different colors, and the other two of the switches respectively correspond to other two sub-pixels used to display different colors.

In an embodiment, the first conductive lines are a first data line, a second data line, and a third data line that are consecutively arranged, the second conductive lines are a first scan line, a second scan line, and a third scan line that are consecutively arranged, the another direction is a first direction, and the direction is a second direction.

In an embodiment, the array substrate is driven in a row inversion manner, wherein the two of the switches correspond to two sub-pixels used to display a first color, the other two of the switches correspond to other two sub-pixels used to display a second color, and the first color is different from the second color.

At least one embodiment of the present invention also provides a display panel, comprising a light-shielding structure, wherein the light-shielding structure comprises a first light-shielding pattern, having a plurality of first portions and a plurality of second portions that are alternately arranged along a direction, wherein one of the first portions has a first width, one of the second portions has a second width, and the first width is greater than the second width.

In an embodiment, the display panel further comprises an array substrate, the array substrate comprising: three first conductive lines, three second conductive lines, and four switches. The three first conductive lines are sequentially and consecutively arranged along a direction, and the three second conductive lines are sequentially and consecutively arranged along another direction and intersect the first conductive lines. The four switches are respectively connected to the corresponding first conductive lines and the corresponding second conductive lines. The other two of the switches are not connected to the second one of the first conductive lines and are substantially located between the other two adjacent second conductive lines. The first portion corresponds to and substantially overlaps two of the switches, and the second portion is connected to the first portion and does not correspond to and does not overlap the switches.

In an embodiment, the second width is 50% to 70% of the first width.

In an embodiment, the display panel further comprises: three first conductive lines, sequentially and consecutively arranged along a direction; three second conductive lines, sequentially and consecutively arranged along another direction and intersecting the first conductive lines; and four switches respectively connected to the corresponding first conductive lines and the corresponding second conductive lines. The two of the switches are connected to the second one of the first conductive lines; the second one of the first conductive lines is the first light-shielding pattern, the first portion corresponds to the two of the switches, and the second portion is connected to the first portion; and the two of the switches are substantially located between two adjacent second conductive lines. The other two of the switches are not connected to the second one of the first conductive lines and are substantially located between the other two adjacent second conductive lines. The second portion does not correspond to the switches.

In an embodiment, the second width is 40% to 60% of the first width.

At least one embodiment of the present invention also provides a display panel, comprising an array substrate, comprising: three first conductive lines, sequentially and consecutively arranged along a direction; three second conductive lines, sequentially and consecutively arranged along another direction and intersect the first conductive lines; four switches, respectively connected to the corresponding first conductive lines and corresponding second conductive lines; and four pixel electrodes, adjacent to each other, and respectively connected to the corresponding four switches, wherein a first minimum distance between two of the pixel electrodes is shorter than a second minimum distance between the other two of the pixel electrodes.

In an embodiment, the first minimum distance is 50% to 70% of the second minimum distance.

In an embodiment, two of the switches are connected to the second one of the first conductive lines and are substantially located between two adjacent second conductive lines. The other two of the switches are not connected to the second one of the first conductive lines and are substantially located between the other two adjacent second conductive lines.

In an embodiment, the display panel further comprises a light-shielding structure comprising: a first light-shielding pattern, having a plurality of first portions and a plurality of second portions that are alternately arranged along a direction, wherein one of the first portions has a first width, one of the second portions has a second width, and the first width is greater than the second width. The first portion corresponds to and substantially overlaps the two of the switches, the second portion is connected to the first portion and does not correspond to and does not overlap the switches, and the second width is 40% to 60% of the first width.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
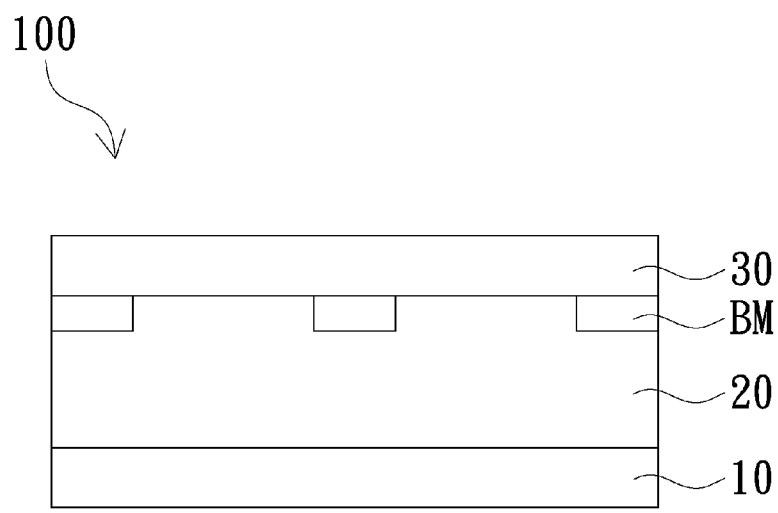
FIG. 1 is a schematic sectional diagram of a display panel according to an embodiment of the present invention.

To make the foregoing and other objectives, features, and advantages of the present invention more comprehensible, detailed description is provided below with reference to the embodiments and accompanying drawings. The present invention is further described thoroughly below with reference to the accompanying drawings. Exemplary embodiments of the present invention are shown in the accompanying drawings. A person skilled in the art shall understand that the described embodiments may be changed in various manners without departing from the spirit or scope of the present invention.

In the accompanying drawings, for clarity, the thickness of elements is enlarged. In the entire specification, a same reference numeral represents a same element. It should be understood that when an element such as a layer, a film, a region or a substrate is "disposed on another element", "connected to another element", "overlapped with another element", or the like, the element may be directly disposed on the another element or connected to the another element, or an intermediate element may also exist between the two elements. In contrast, when an element is "directly disposed on another element" or "directly connected to another element", no intermediate element exists. As used herein, a "connection" may be a physical and/or electrical connection.

It should be understood that terms such as "first", "second", and "third" are used to describe various elements, components, regions, layers and/or parts herein. However, these elements, components, regions, layers and/or parts should not be limited by these terms. These words are only used for distinguishing between an element, a component, a region, a layer and/or a part from another element, component, region, layer and/or part. Therefore, a "first element", "component", "region", "layer" and/or "part" hereinafter may also be referred to as a "second element", "component", "region", "layer" and/or "part" without departing from the concept of the present disclosure.

The terms used herein are only used for the objective of describing particular embodiments, rather than to limit the present invention. As used herein, unless clearly designated in the content, singular forms "a" and "the" also intend to comprise a plural form. "or" represents "and/or". As used herein, the term "and/or" comprises any combination or all combinations of one or more listed items. It should further be understood that when the term "comprise" and/or "comprise" is used in the specification, the term indicates the presence of a feature, a region, a whole, a step, an operation, an element, and/or a component, but the presence or addition of one or more other features, regions, wholes, steps, operations, elements, components and/or combinations thereof is not excluded.

In addition, relative terms such as "under" or "bottom" and "on" or "top" may be used herein to describe a relationship between an element and another element, as shown in the drawings. It should be understood that, the relative terms intend to comprise different positions of an apparatus other than the position shown in the drawings. For example, if an apparatus in one drawing is inverted, an element "under" another element turns to be "on" the another element. Therefore, exemplarily, the term "under" may comprise both "under" and "on", depending on particular directions of the accompanying drawings. Similarly, if an apparatus in one accompanying drawing is inverted, an element "below" another element turns to be "above" the another element. Therefore, the exemplary term "below" may comprise both below and above.

"Approximately", "substantially", or "nearly" used herein comprises a discussed value and an average value within a tolerable deviation range that is of a particular value and is determined by a person of ordinary skill in the art, considering a particular quantity of errors of measurement and errors related to measurement (that is, restrictions of a measurement system). For example, "approximately" may represent one or more standard deviations from a value, or ±30%, ±20%, ±10%, ±5%.

Unless otherwise defined, all terms (comprising technical terms and scientific terms) used herein have meanings the same as those usually understood by a person of ordinary skill in the art of the present invention. It is further understood that those terms defined in commonly used dictionaries should be explained with meanings consistent with meanings of the terms in related technology and the context of the present invention, and are not explained with ideal or excessively formal meanings, unless clearly defined herein.

Herein, exemplary embodiments are described with reference to sectional views of schematic diagrams of ideal embodiments. Therefore, changes of shapes in drawings that are used as results of manufacturing technology, tolerances, and/or the like may be expected. Therefore, herein, the embodiments should not be explained to be limited to particular shapes of regions herein, but instead, comprise shape deviations caused by manufacturing and the like. For example, regions that are shown or described to be flat may usually have rough and/or nonlinear features. In addition, a shown acute angle may be rounded. Therefore, regions in the drawings are essentially schematic, and shapes of the regions are not intended to show precise shapes of the regions and are not intended to limit the scope of the claims.

Referring to FIG. 1, FIG. 1 is a schematic sectional diagram of a display panel 100 according to an embodiment of the present invention. As shown in FIG. 1, the display panel 100 in this embodiment includes an array substrate 10, a display medium layer 20, a light-shielding layer BM, and an opposite substrate 30. The array substrate 10 includes a plurality of sub-pixels (not shown). The sub-pixels are used as basic units of a display picture and form a pixel array. In this embodiment, the display panel 100 may be a liquid crystal display panel. The liquid crystal display panel may be an in-plane field-driven liquid crystal display panel such as a fringe field switching (FFS) liquid crystal display panel or an in-plane switching (IPS) liquid crystal display panel, but is not limited thereto. In another embodiment, the display panel 100 may also be a blue-phase liquid crystal display panel or another suitable display panel. In addition, the array substrate 10 and the opposite substrate 30 may be transparent substrates, and may be rigid substrates or flexible substrate such as glass substrates, plastic substrates or sapphire substrates, but are not limited thereto.

Figure 2:
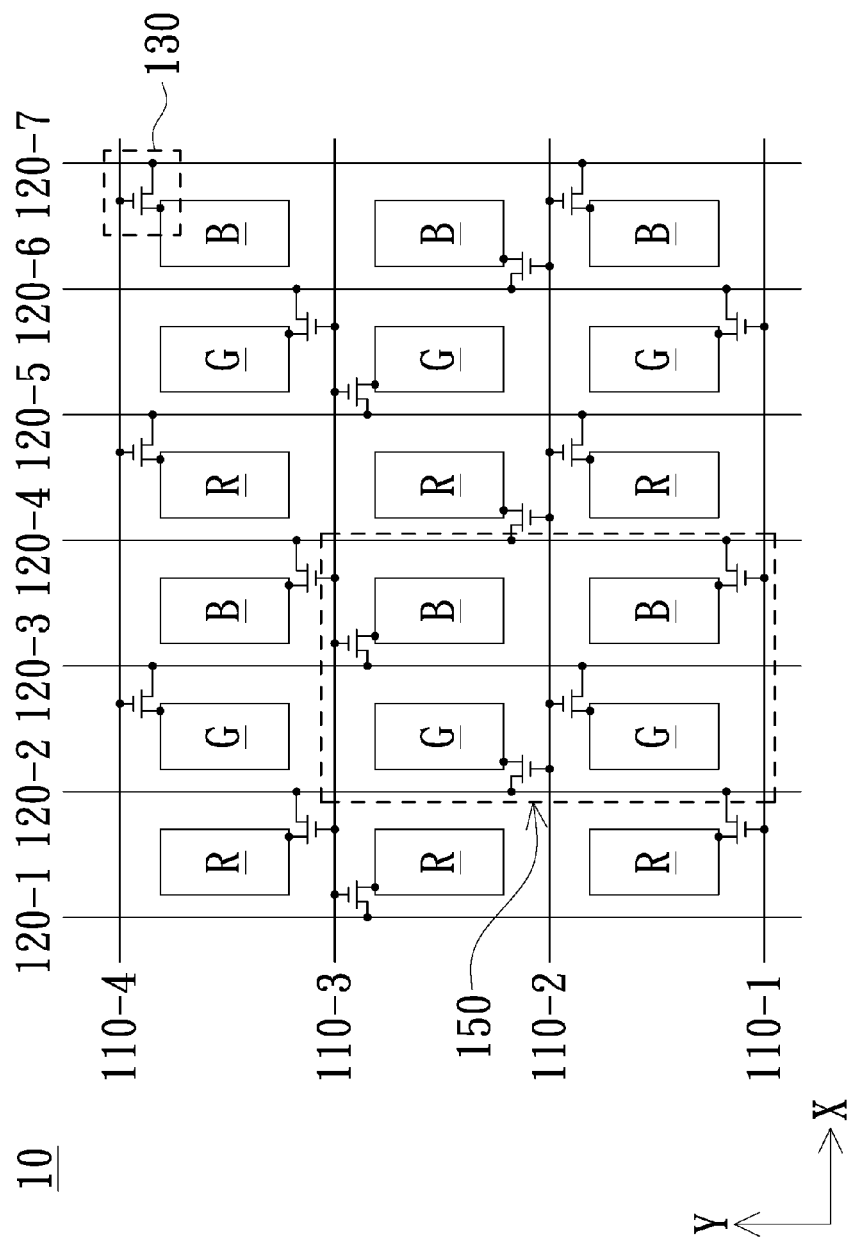
FIG. 2 is a schematic diagram of the layout of pixel units in an array substrate of a display panel according to an embodiment of the present invention.

Referring to FIG. 2, FIG. 2 is a schematic diagram of the layout of pixel units in an array substrate 10 of a display panel 100 according to an embodiment of the present invention. As shown in FIG. 2, the array substrate 10 includes: multiple conductive lines 110-1, 110-2, 110-3, and 110-4; multiple conductive lines 120-1, 120-2, 120-3, 120-4, 120-5, 120-6, and 120-7; and a plurality of switches 130.

As shown in FIG. 2, in this embodiment, the conductive lines 110-1, 110-2, 110-3, and 110-4 are sequentially and consecutively arranged from bottom to top along a direction being a Y direction and are used as scan lines for example, and the conductive lines 120-1, 120-2, 120-3, 120-4, 120-5, 120-6, and 120-7 are sequentially and consecutively arranged from left to right along another direction being an X direction and are used as data lines for example, and may intersect the conductive lines 110-1, 110-2, 110-3, and 110-4 respectively, so as to define, in the array substrate 10, an array of a plurality of sub-pixels that is sequentially arranged in an array manner along the X direction and includes a red sub-pixel R, a green sub-pixel G, and a blue sub-pixel B. Here, switches 130 are disposed respectively in the red sub-pixel R, the green sub-pixel G, and the blue sub-pixel B. The switches 130 are respectively connected to the corresponding conductive lines 110-1, 110-2, 110-3, and 110-4 and the corresponding conductive lines 120-1, 120-2, 120-3, 120-4, 120-5, 120-6, and 120-7. In the embodiment shown in FIG. 2, adjacent sub-pixels in a same Y direction display a same color and adjacent sub-pixels in a same X direction sequentially display different colors. A width in the Y direction of each sub-pixel is greater than that in the X direction of each sub-pixel. However, the present invention is not limited thereto.

Figure 3:
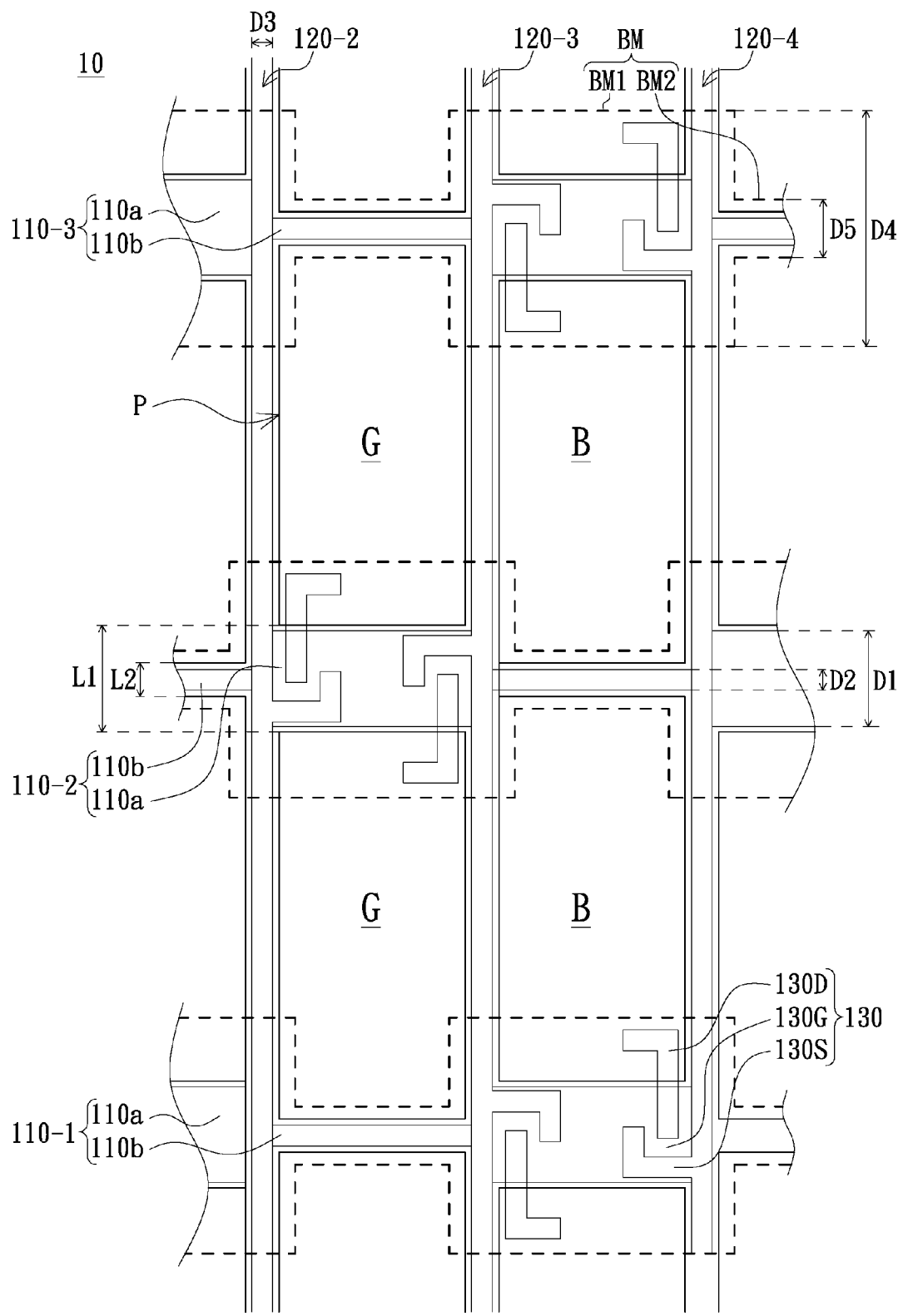
FIG. 3 is a schematic top diagram of a region 150 in FIG. 2 according to an embodiment of the present invention.

Next, referring to FIG. 3, FIG. 3 is a schematic top diagram of a region 150 in FIG. 2 according to an embodiment of the present invention. Here, only four sub-pixels defined by intersecting the three conductive lines 110-1, 110-2, and 110-3 and the three conductive lines 120-2, 120-3, and 120-4 formed on the array substrate 10 are shown in the region 150. The four sub-pixels are arranged according to a 2*2 array, but are not limited thereto. In this embodiment, the conductive lines 110-1, 110-2, and 110-3 are used as scan lines. The conductive lines 110-1, 110-2, and 110-3 extend along a direction being an X direction in FIG. 3 and have a plurality of first portions 110a and a plurality of second portions 110b that are alternately arranged. The first portions 110a respectively have a first width D1, the second portions 110b respectively have a second width D2, and the first width D1 is greater than the second width D2. In an embodiment, the second width D2 is approximately 40% to 60% of the first width D1. In this case, the conductive lines 110-1, 110-2, and 110-3 are not with a uniform width. Moreover, the conductive lines 120-2, 120-3, and 120-4 are data lines. The conductive lines 120-2, 120-3, and 120-4 extend along a direction being a Y direction in FIG. 3 and have an approximately uniform width D3.

Refer to FIG. 1 and FIG. 3 together. In the display panel 100 in this embodiment, the light-shielding layer BM is disposed on the opposite substrate 30, is located between the display medium layer 20 and the opposite substrate 30, is used to shield region between a nontransparent element of the array substrate 10 and a pixel electrode, to prevent light from leaking so as to prevent a display effect from being affected. However, the present invention is not limited thereto. The light-shielding layer BM drawn with a dotted line in FIG. 3 correspondingly covers the first portions 110a and the second portions 110b of the conductive lines 110-1, 110-2, and 110-3. The light-shielding layer BM also includes a plurality of first portions BM1 and a plurality of second portions BM2 that are alternately arranged and have different widths. Contours of the first portions BM1 and the second portions BM2 of the light-shielding layer BM are respectively approximately similar to contours of the first portions 110a and the second portions 110b of the conductive lines 110-1, 110-2, and 110-3, and are slightly greater than widths of the first portions 110a and the second portions 110b of the conductive lines 110-2, 110-3, and 110-4 covered by the first portions BM1 and the second portions BM2. At least one first portion BM1 may also further cover the switches 130, and the second portions 110b, for example, does not cover switches 130, to prevent light from leaking at an edge of a pixel electrode and in a region in which no pixel electrode is disposed during operation of the display panel 100, so as to prevent a display effect from being affected. In an embodiment, the first portions BM1 of the light-shielding layer BM respectively have a first width D4 and the second portions BM2 of the light-shielding layer BM respectively have a second width D5. The first width D4 is greater than the second width D5, and the second width D5 is 50% to 70% of the first width D4. In another embodiment, the light-shielding layer BM may be disposed between the array substrate 10 and the display medium layer 20 or disposed in the array substrate 10.

In addition, along the Y direction, the first portions 110a and the second portions 110b are alternately disposed. For example, along the Y direction, one first portion 110a of the conductive line 110-1, one second portion 110b of the conductive line 110-2, and one first portion 110a of the conductive line 110-3 are sequentially arranged.

As shown in FIG. 3, in this embodiment, the switch 130 in each sub-pixel is, for example, a thin film transistor (TFT). The TFT includes a gate 130G, a channel (not shown), a source 130S, and a drain 130D. The gate 130G is, for example, some of the first portions 110a. The source 130S is electrically connected to one of the corresponding conductive lines 120-2, 120-3, and 120-4. The drain 130D is electrically connected to a corresponding pixel electrode P.

In this embodiment, two of the switches 130 in four sub-pixels located in the region 150, for example, two switches 130 in sub-pixels on the left side in the region 150 are connected to the first portion 110a of the second one (that is, the conductive line 110-2) of the conductive lines 110-1, 110-2, and 110-3 and are substantially located between the two adjacent conductive lines 120-2 and 120-3. The other two of the switches 130, for example, two switches 130 in sub-pixels on the right side in the region 150 are not connected to the second one (that is, the conductive line 110-2) of the conductive lines 110-1, 110-2, and 110-3, are substantially located between the other two adjacent conductive lines 120-3 and 120-4, and are respectively connected to the first one and the third one of the conductive lines 110-1, 110-2, and 110-3.

As shown in FIG. 3, because the first portions 110a and the second portions 110b are alternately disposed along the Y direction, two of the pixel electrodes P located in the four sub-pixels, for example the pixel electrodes P in two sub-pixels on the left side in the region 150, have a minimum distance L1 along the Y direction, and the other two of the pixel electrodes P in the four sub-pixels, for example, two pixel electrodes P in two sub-pixels on the right side in the region 150 have a minimum distance L2 along the Y direction. In an embodiment, this minimum distance L2 is 50% to 70% of the minimum distance L1.

Moreover, as shown in FIG. 3, the two of the switches 130 connected to the second one of the conductive lines in the region 150, for example, the conductive line 110-2 located in the middle, correspond to two green sub-pixels G used to display a first color such as green. The other two of the switches 130 that are not connected to the second one of the conductive lines, for example, the conductive line 110-2 located in the middle, and are substantially located between the other two adjacent conductive lines correspond to the other two blue sub-pixels B used to display a second color such as blue. The first color is different from the second color.

In this embodiment, connection relationships between the switches 130 in the pixel units in the array substrate 10 and the conductive lines 110-1, 110-2, 110-3, and 110-4 and the conductive lines 120-1, 120-2, 120-3, 120-4, 120-5, 120-6, and 120-7 are shown in FIG. 2-3. During a display operation, potentials having different polarities being positive (+) or negative (−) are respectively applied or potentials having the same polarity but different voltages are respectively applied to adjacent conductive lines of the conductive lines 120-1, 120-2, 120-3, 120-4, 120-5, 120-6, and 120-7. The pixel units of the display panel 100 are driven in a dot inversion manner. Therefore, potentials in adjacent sub-pixels along the X direction and the Y direction have different polarities. That is, in this embodiment, the array substrate 10 is driven in a dot inversion manner.

Figure 4:
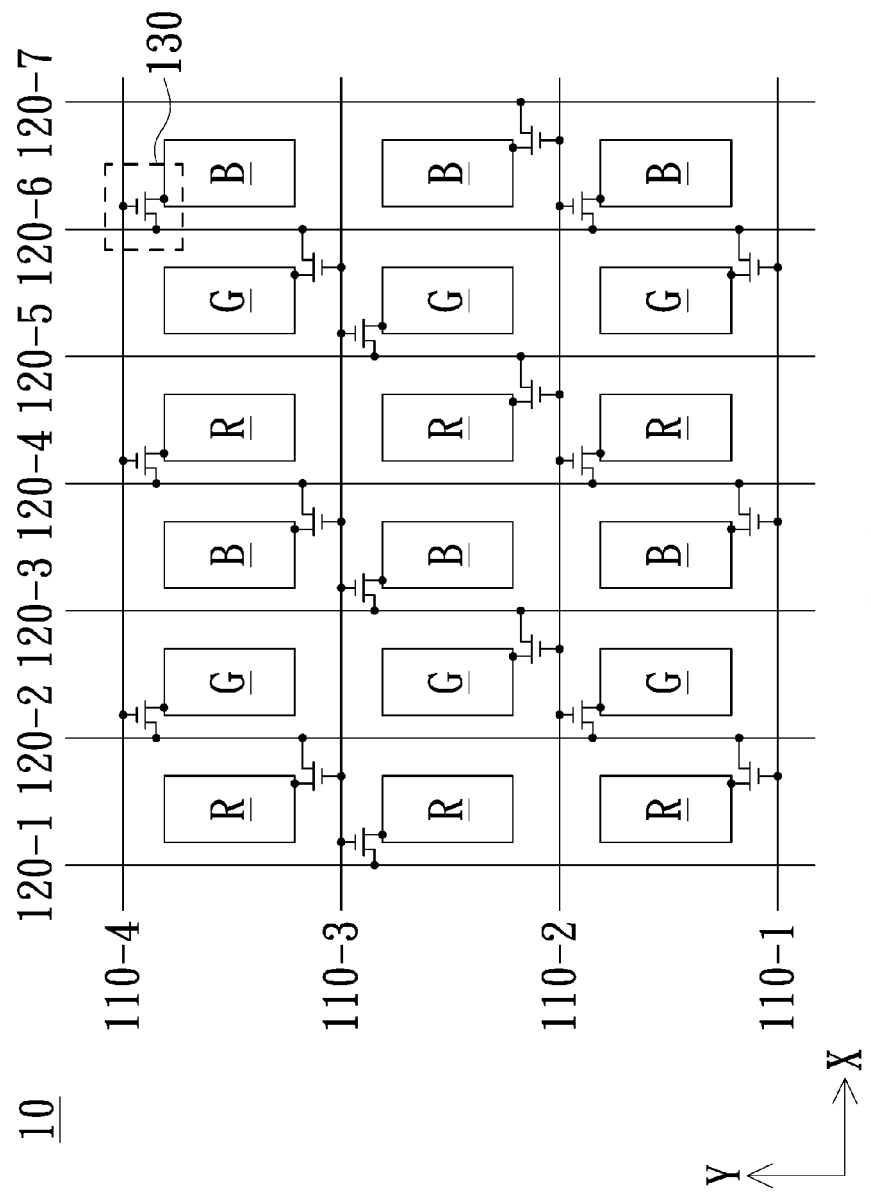
FIG. 4 is a schematic diagram of the layout of pixel units in an array substrate of a display panel according to another embodiment of the present invention.

FIG. 4 is a schematic diagram of the layout of pixel units in an array substrate 10 of a display panel 100 according to another embodiment of the present invention. The layout of the pixel units in the array substrate 10 of the display panel 100 shown in FIG. 4 is similar to the layout of the pixel units in the array substrate 10 of the display panel 100 shown in FIG. 2, except that the electrical connection of switches 130 in pixel units in the second column, fourth column, and sixth column arranged along an X direction in FIG. 4 is opposite to the electrical connection of the switches 130 in the pixel units in the second column, fourth column, and sixth column arranged along an X direction in FIG. 2. During a display operation, potentials having different polarities being positive (+) or negative (−) are respectively applied or potentials having the same polarity but different voltages are respectively applied to adjacent conductive lines of the conductive lines 120-1, 120-2, 120-3, 120-4, 120-5, 120-6, and 120-7. The pixel units of the display panel 100 are driven in a row inversion manner. Therefore, potentials of sub-pixels in a same row that extend along the X direction have the same polarity and potentials of along adjacent sub-pixels arranged in a Y direction have different polarities. That is, in this embodiment, the array substrate 10 is driven in a row inversion manner.

In the embodiments shown in FIG. 2 to FIG. 4, the pixel electrode P used in each pixel region is an electrode that does not have a slit, but is not limited thereto. In another embodiment, the pixel electrode P may be an electrode that has slits. In addition, the material of the conductive lines 110-1, 110-2, 110-3, and 110-4 and the conductive lines 120-1, 120-2, 120-3, 120-4, 120-5, 120-6, and 120-7 may include a metal or another nontransparent conductive material having relatively low impedance, so as to reduce a loss of display information during transfer. The material of the pixel electrode P may include indium tin oxide (ITO), indium zinc oxide (IZO) or another suitable transparent conductive material. The switch 130 may be another suitable switch element in addition to a TFT.

Moreover, in the embodiments shown in FIG. 2 to FIG. 4, a plurality of first portions 110a and a plurality of second portions 110b that are alternately arranged and have different widths are respectively used for the conductive lines 110-1, 110-2, 110-3, and 110-4 and the light-shielding layer BM corresponding to the conductive lines 110-1, 110-2, 110-3, and 110-4, and positions where the switches 130 are disposed in four adjacent sub-pixels that are arranged according to a 2*2 array are adjusted, so that two of the switches 130 in the four sub-pixels are connected to the adjacent second one of three adjacent conductive lines, and the other two of the switches 130 are not connected to the second one of three adjacent conductive lines and are respectively connected to the first one and the third one of the three adjacent conductive lines. The conductive lines 110-1, 110-2, 110-3, and 110-4 and the second portions in the corresponding light-shielding layer BM are used to reduce a light-shielding region, thereby increasing an area for a pixel electrode to increase aperture ratios of some sub-pixels.

Figure 5:
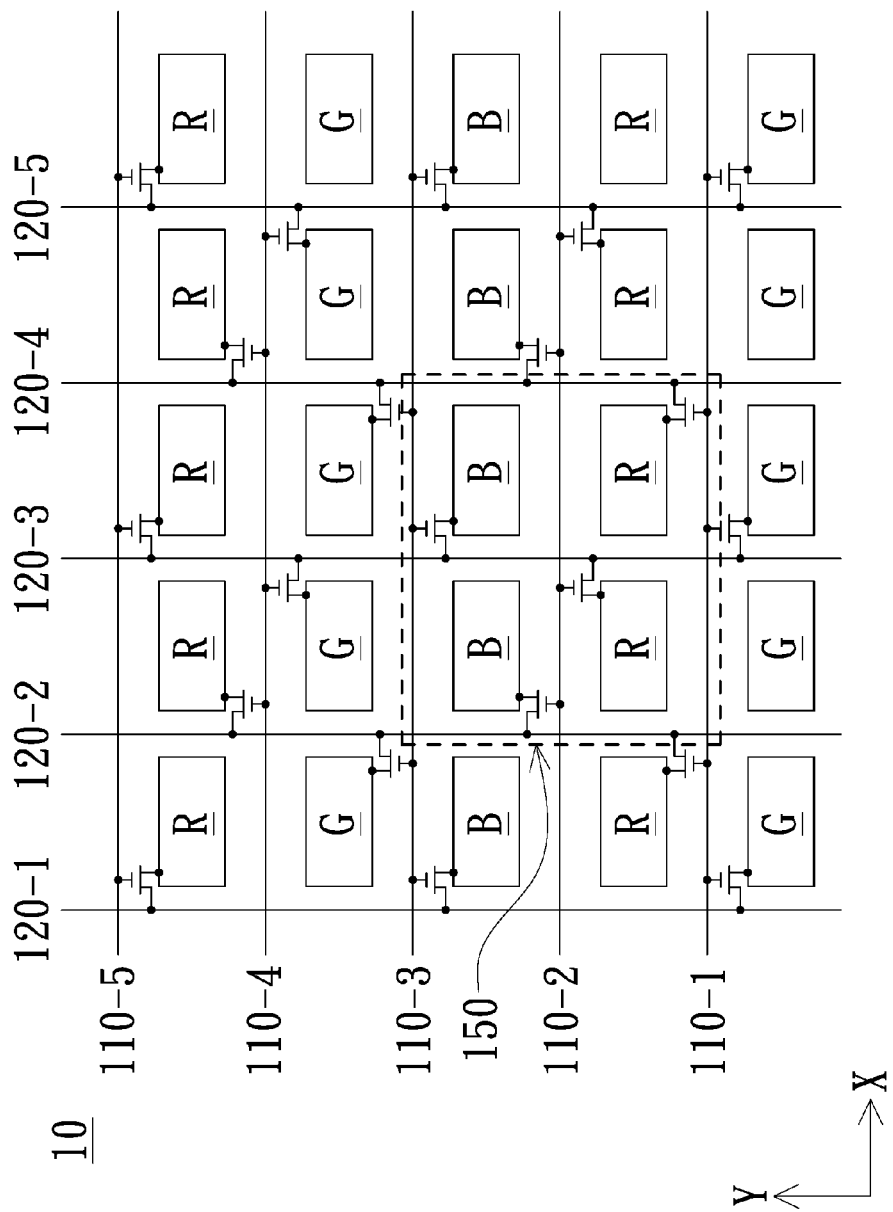
FIG. 5 is a schematic diagram of the layout of pixel units in an array substrate of a display panel according to still another embodiment of the present invention.

FIG. 5 is a schematic diagram of the layout of pixel units in an array substrate 10 of a display panel 100 according to still another embodiment of the present invention. As shown in FIG. 5, the array substrate 10 includes conductive lines 110-1, 110-2, 110-3, 110-4, and 110-5; conductive lines 120-1, 120-2, 120-3, 120-4, and 120-5; and switches 130.

As shown in FIG. 5, in this embodiment, the conductive lines 110-1, 110-2, 110-3, 110-4, and 110-5 are sequentially and consecutively arranged from bottom to top along a direction being a Y direction, and the conductive lines 120-1, 120-2, 120-3, 120-4, and 120-5 are sequentially and consecutively arranged from left to right along another direction being an X direction, and intersect the conductive lines 110-1, 110-2, 110-3, 110-4, and 110-5 respectively, so as to define, in the array substrate 10, an array of a plurality of sub-pixels that is sequentially arranged in an array manner along the X direction and includes a red sub-pixel R, a green sub-pixel G, and a blue sub-pixel B. Switches 130 are disposed respectively in the red sub-pixels R, the green sub-pixels G, and the blue sub-pixels B. The switches 130 are respectively electrically connected to the corresponding conductive lines 110-1, 110-2, 110-3, 110-4, and 110-5 and the corresponding conductive lines 120-1, 120-2, 120-3, 120-4, and 120-5. In the embodiment shown in FIG. 5, adjacent sub-pixels in the same X direction display a same color while adjacent sub-pixels in the same Y direction sequentially display different colors, and a size of each sub-pixel in the X direction is greater than a size of each sub-pixel in the Y direction.

As shown in FIG. 5, a schematic top diagram of a region 150 is approximately similar to that shown in FIG. 3. Differences of FIG. 5 from FIG. 3 are that adjacent sub-pixels in the same X direction display a same color while adjacent sub-pixels in the same Y direction sequentially display different colors, a size of each sub-pixel in the X direction is greater than a size of each sub-pixel in the Y direction, and the connection between the switches 130 located in two sub-pixels on the right side and the conductive lines 120-3 and 120-4 is slightly different. The rest members and implementations are all similar to those in FIG. 3, and FIG. 5 and FIG. 3 have the same implementation condition. Therefore, repetitive parts are no longer elaborated.

Moreover, as shown in FIG. 5, two of the switches 130 connected to the second one of the conductive lines in the region 150, for example, the conductive line 110-2 located in the middle, corresponding to two sub-pixels R and B that are used to display different colors such as blue and red. The other two of the switches 130 that are not connected to the second one of the conductive lines, for example, the conductive line 110-2 located in the middle, and are substantially located between the other two adjacent conductive lines also correspond to two sub-pixels R and B that are used to display different colors such as blue and red. Adjacent sub-pixels in a same row direction display a same color.

As shown in FIG. 5, connection relationships between the switches 130 in the pixel units in the array substrate 10 of the display panel 100 and the conductive lines 110-1, 110-2, 110-3, 110-4, and 110-5 and the corresponding conductive lines 120-1, 120-2, 120-3, 120-4, and 120-5 are shown in FIG. 5. During a display operation, potentials having different polarities being positive (+) or negative (−) are respectively applied or potentials having the same polarity but different voltages are respectively applied to adjacent conductive lines of the conductive lines 120-1, 120-2, 120-3, 120-4, and 120-5. The pixel units of the display panel 100 are driven in a dot inversion manner. Therefore, potentials in adjacent sub-pixels along the X direction and the Y direction have different polarities. That is, in this embodiment, the array substrate 10 is driven in a dot inversion manner.

Moreover, similar to the implementations in the embodiments shown in FIG. 2 to FIG. 4, a plurality of first portions and a plurality of second portions that are alternately arranged and have different widths in the embodiments shown in FIG. 2 to FIG. 4 are also respectively used for the conductive lines 110-1, 110-2, 110-3, 110-4, and 110-5 and the light-shielding layer BM corresponding to the conductive lines 110-1, 110-2, 110-3, 110-4, and 110-5 in the embodiment shown in FIG. 5, and positions where the switches 130 are disposed in four adjacent sub-pixels that are arranged according to a 2*2 array are adjusted, so that two of the switches 130 in the four sub-pixels are connected the adjacent second one of three adjacent conductive lines, and the other two of the switches 130 are not connected to the second one of three adjacent conductive lines and are respectively connected to the first one and the third one of the three adjacent conductive lines. The conductive lines 110-1, 110-2, 110-3, 110-4, and 110-5 and the second portions in the corresponding light-shielding layer BM are used to reduce a light-shielding region, thereby increasing an area for a pixel electrode to increase aperture ratios of some sub-pixels.

Figure 6:
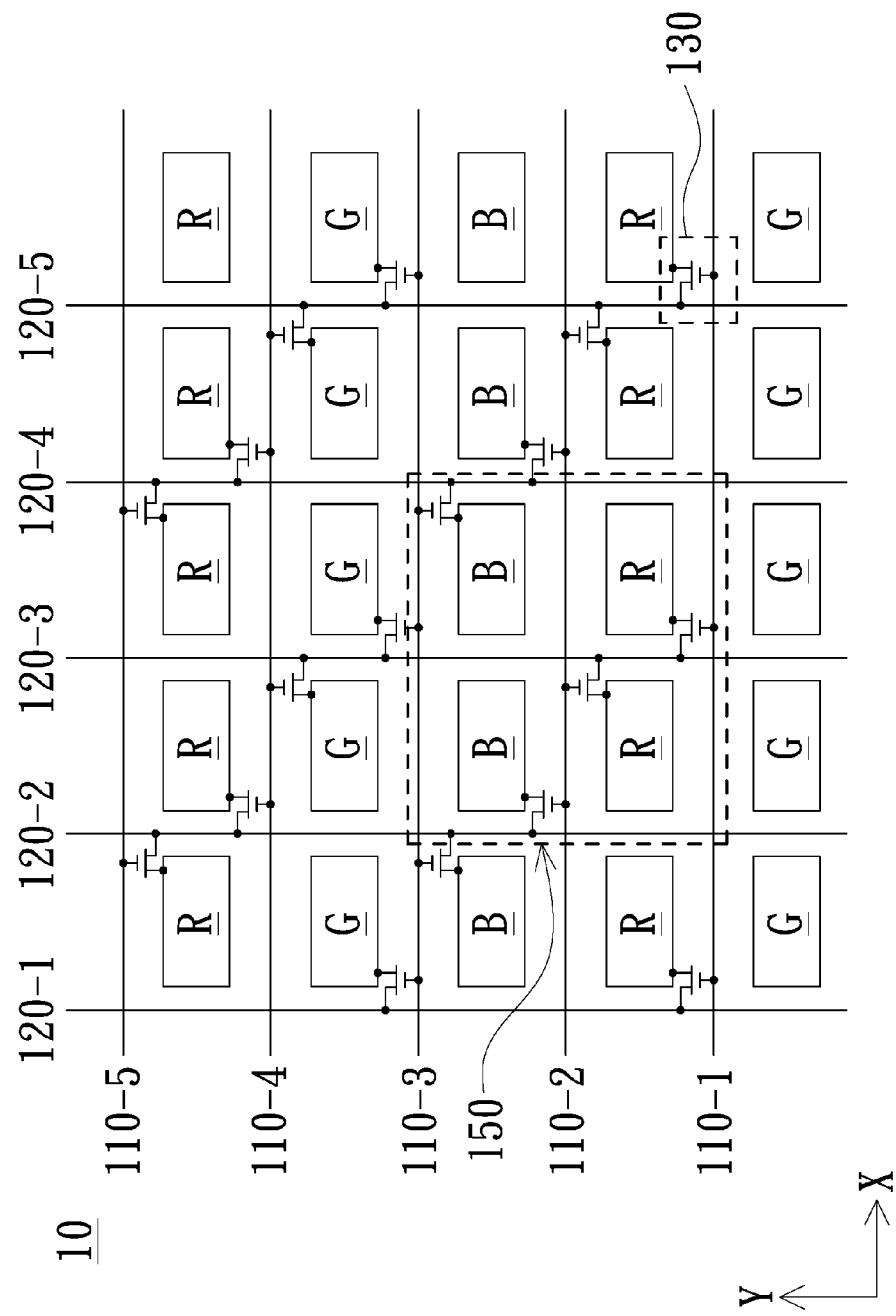
FIG. 6 is a schematic diagram of the layout of pixel units in an array substrate of a display panel according to another embodiment of the present invention.

Referring to FIG. 6, FIG. 6 is a schematic diagram of the layout of pixel units in an array substrate 10 of a display panel 100 according to an embodiment of the present invention. As shown in FIG. 6, the array substrate 10 includes conductive lines 110-1, 110-2, 110-3, 110-4, and 110-5; conductive lines 120-1, 120-2, 120-3, 120-4, and 120-5; and switches 130.

As shown in FIG. 6, in this embodiment, the conductive lines 110-1, 110-2, 110-3, 110-4, and 110-5 are sequentially and consecutively arranged from bottom to top along a direction being a Y direction and are used as scan lines for example, and the conductive lines 120-1, 120-2, 120-3, 120-4, and 120-5 are sequentially and consecutively arranged from left to right along another direction being an X direction and are used as data lines, and intersect the conductive lines 110-1, 110-2, 110-3, 110-4, and 110-5 respectively, so as to define, in the array substrate 10, an array of a plurality of sub-pixels that is sequentially arranged in an array manner along the Y direction and includes a green sub-pixel G, a red sub-pixel R, and a blue sub-pixel B. Here, a switch 130 is disposed respectively in the green sub-pixel G, the red sub-pixel R, and the blue sub-pixel B. The switches 130 are respectively connected to the corresponding conductive lines 120-1, 120-2, 120-3, 120-4, and 120-5 and the corresponding conductive lines 120-1, 120-2, 120-3, 120-4, and 120-5. In the embodiment shown in FIG. 6, adjacent sub-pixels in the same X direction display a same color while adjacent sub-pixels in the same Y direction sequentially display different colors, and a size of each sub-pixel in the X direction is greater than a size of each sub-pixel in the Y direction.

Figure 7:
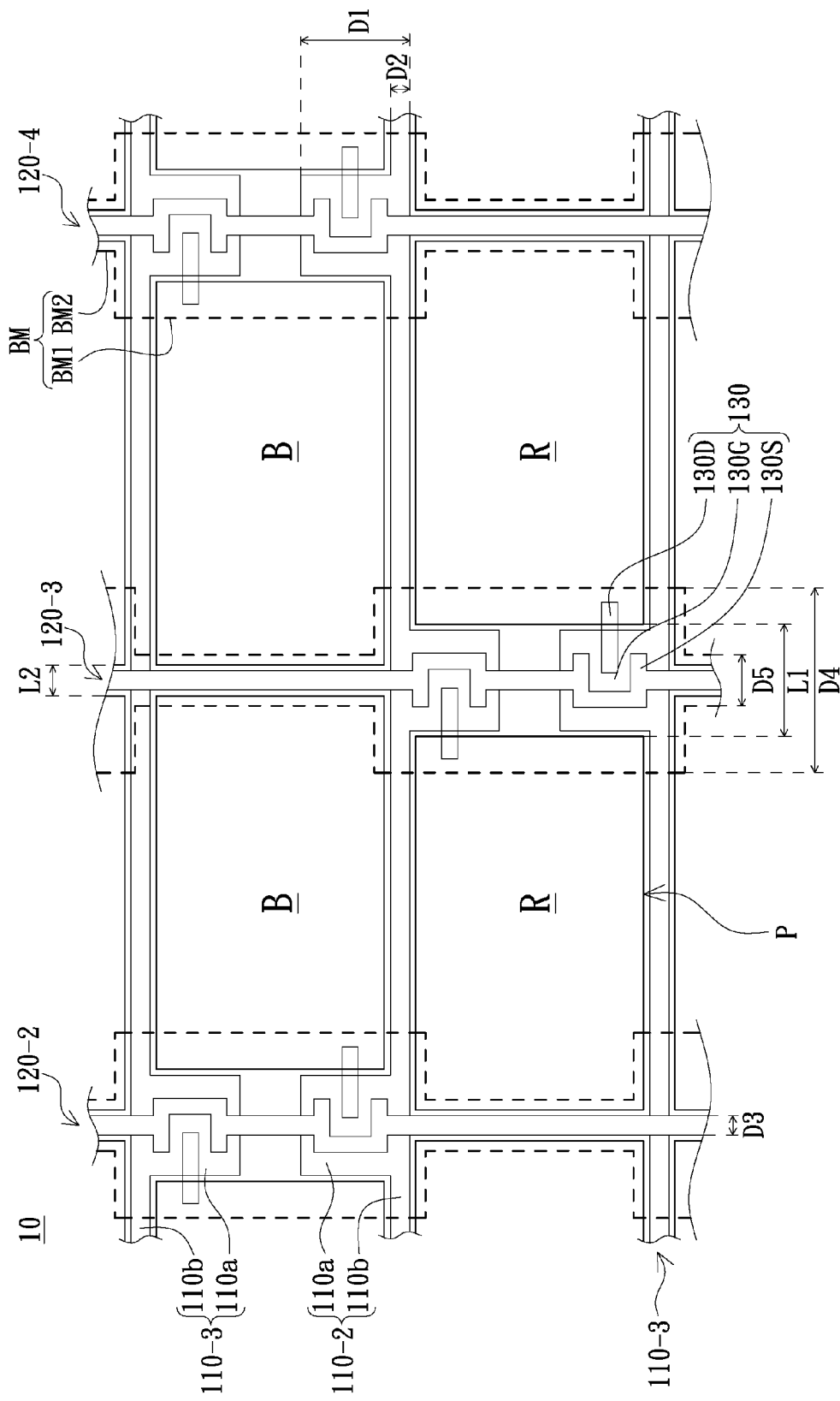
FIG. 7 is a schematic top diagram of a region 150 in FIG. 6 according to an embodiment of the present invention.

Next, referring to FIG. 7, FIG. 7 is a schematic top diagram of a region 150 in FIG. 6 according to an embodiment of the present invention. Here, from ease of description, only four sub-pixels defined by the three conductive lines 110-1, 110-2, and 110-3 and the three conductive lines 120-2, 120-3, and 120-4 are shown in the region 150, and the four sub-pixels are arranged to form a 2*2 array. In this embodiment, the conductive lines 110-1, 110-2, and 110-3 are used as scan lines. The conductive lines 110-1, 110-2, and 110-3 extend along the direction being the X direction in FIG. 7 and have a plurality of first portions 110a and a plurality of second portions 110b that are alternately arranged. The first portions 110a respectively have a first width D1, and the second portions 110b respectively have a second width D2. The first width D1 is greater than the second width D2. In an embodiment, the second width D2 is approximately 40% to 60% of the first width D1. In this case, the conductive lines 110-1, 110-2, and 110-3 are not conductive lines with a uniform width. Moreover, the conductive lines 120-2, 120-3, and 120-4 are data lines. The conductive lines 120-2, 120-3, and 120-4 extend along a direction being a Y direction in FIG. 6 and may have an approximately uniform width D3. In this embodiment, the first portions 110a in the conductive lines 110-1, 110-2, and 110-3 are located at positions where the conductive lines 110-1, 110-2, and 110-3 and the conductive lines 120-2, 120-3, and 120-4 intersect. The second portions 110b in the conductive lines 110-1, 110-2, and 110-3 are respectively approximately disposed between two adjacent conductive lines of the conductive lines 120-2, 120-3, and 120-4.

Refer to FIG. 7 again and at the same time refer to FIG. 1. In the display panel 100 in this embodiment, the light-shielding layer BM is disposed on the opposite substrate 30, is located between the display medium layer 20 and the opposite substrate 30, is used to shield a nontransparent element of the array substrate 10 and an adjacent region of a pixel electrode, to prevent light from leaking at an edge of a pixel electrode and in a region in which no pixel electrode is disposed during operation of the display panel 100, so as to prevent a display effect from being affected, and is also used to separate adjacent sub-pixel regions. In this case, the light-shielding layer BM drawn with a dotted line in FIG. 6 correspondingly covers the first portions 110a of the conductive lines 110-1, 110-2, and 110-3 and the conductive lines 120-2, 120-3, and 120-4 intersecting the conductive lines 110-1, 110-2, and 110-3. Therefore, the light-shielding layer BM also includes a plurality of first portions BM1 and a plurality of second portions BM2 that are alternately arranged and have different widths. For example, each light-shielding layer BM extends along the Y direction, and contours of the first portions BM1 and the second portions BM2 of the light-shielding layer BM are respectively approximately similar to contours of the first portions 110a of the conductive lines 110-1, 110-2, and 110-3 and contours of the conductive lines 120-2, 120-3, and 120-4 intersecting the conductive lines 110-1, 110-2, and 110-3, and are slightly greater than the first portions 110a of the conductive lines 110-2, 110-3, and 110-4 and the conductive lines 120-2, 120-3, and 120-4 intersecting the conductive lines 110-1, 110-2, and 110-3 covered by the light-shielding layer BM, to prevent light from leaking at an edge of a pixel electrode and in a region in which no pixel electrode is disposed during operation of the display panel 100, so as to prevent a display effect from being affected. In an embodiment, the first portions BM1 of the light-shielding layer BM respectively have a first width D4 and the second portions respectively have a second width D5, the first width D4 is greater than the second width D5, and the second width D5 is 50% to 70% of the first width D4. In another embodiment, the light-shielding layer BM may be disposed between the array substrate 10 and the display medium layer 20 or disposed in the array substrate 10.

As shown in FIG. 7, the switch 130 in each sub-pixel in this embodiment is, for example, a TFT, and includes a gate 130G overlapping some of the first portions 110a in the conductive lines 110-1, 110-2, and 110-3, a source 130S disposed on the first portions 110a and connected to some of the conductive lines 120-2, 120-3, and 120-4, and a drain 130D disposed on the first portions 110a and extending into a display region of each sub-pixel. In addition, a pixel electrode P is further disposed in a display region of each sub-pixel, and is connected to the drain 130D.

In FIG. 7, in this embodiment, two of the switches 130 located in the four sub-pixels, for example, two switches 130 of sub-pixels on the lower side in the region 150, are connected to the second one of the conductive lines 120-2, 120-3, and 120-4 in the region 150 (that is, the conductive line 120-3 located in the middle) and are substantially located between two adjacent conductive lines, that is, located between the conductive lines 110-1 and 110-2 in the middle and below. The other two of the switches 130, for example, two switches 130 of sub-pixels on the upper side in the region 150, are not connected to the second one of the conductive lines 120-2, 120-3, and 120-4 (that is, the conductive line 120-3 located in the middle), are substantially located between the other two adjacent conductive lines (that is, between the conductive lines 110-2 and 110-3 above and in the middle in the region 150), and are respectively connected to the first one and the third one of the conductive lines 120-2, 120-3, and 120-4, for example, are located in the conductive line 120-2 on the left and the conductive lines 120-4 on the right.

As shown in FIG. 7, the first portions 110a and the second portions 110b of the conductive lines 110-1, 110-2, and 110-3 are alternately disposed. Therefore, two of the pixel electrodes P located in the four sub-pixels, for example, pixel electrodes P in two sub-pixels on the lower side in the region 150 have a minimum distance L1 therebetween. The other two of the pixel electrodes P in the four sub-pixels, for example, two pixel electrodes P in two sub-pixels on the upper side in the region 150 have a minimum distance L2 therebetween. In an embodiment, this minimum distance L2 is 50% to 70% of the minimum distance L1.

Moreover, as shown in FIG. 7, two of the switches 130 connected to the second one of the conductive lines in the region 150, for example, the conductive line 120-3 located in the middle, corresponding to two red sub-pixels R used to display a first color such as red. The other two of the switches 130 that are not connected to the second one of the conductive lines, for example, the conductive line 120-3 located in the middle, and are substantially located between the other two conductive lines correspond to other two blue sub-pixels B used to display a second color such as blue. The first color is different from the second color.

As shown in FIG. 6 and FIG. 7, connection relationships between the switches 130 in the pixel units in the array substrate 10 of the display panel 100 and the conductive lines 110-1, 110-2, 110-3, 110-4, and 110-5 and the conductive lines 120-1, 120-2, 120-3, 120-4, and 120-5 are shown in FIG. 6. During a display operation, potentials having different polarities being positive (+) or negative (−) are respectively applied or potentials having the same polarity but different voltages are respectively applied to adjacent conductive lines of the conductive lines 120-1, 120-2, 120-3, 120-4, and 120-5. The pixel units of the display panel 100 are driven in a row inversion manner. Therefore, potentials of sub-pixels in a same row along the X direction have the same polarity and potentials of adjacent sub-pixels along the Y direction have different polarities. That is, in this embodiment, the array substrate 10 is driven in a row inversion manner.

In the embodiments shown in FIG. 6 and FIG. 7, the pixel electrode P used in each pixel region is an electrode that does not have a slit, but is not limited thereto. In another embodiment, the pixel electrode P may be an electrode that has slits. In addition, the material of the conductive lines 110-1, 110-2, 110-3, 110-4, and 110-5 and the conductive lines 120-1, 120-2, 120-3, 120-4, and 120-5 may include a metal or another nontransparent conductive material having relatively low impedance, so as to reduce a loss of display information during transfer. The material of the pixel electrode P may include ITO, IZO or another suitable transparent conductive material. The switch 130 may be another suitable switch element in addition to a TFT.

Moreover, in the embodiments shown in FIG. 6 and FIG. 7, a plurality of first portions and a plurality of second portions that are alternately arranged and have different widths are respectively used for the first portions 110a in the conductive lines 110-1, 110-2, 110-3, 110-4, and 110-5, the conductive lines 120-1, 120-2, 120-3, 120-4, and 120-5 intersecting the conductive lines 110-1, 110-2, 110-3, 110-4, and 110-5, and the corresponding light-shielding layer BM, and positions where the switches 130 are disposed in four adjacent sub-pixels that are arranged according to a 2*2 array are adjusted, so that two of the switches 130 in the four sub-pixels are connected to the adjacent second one of three adjacent conductive lines, and the other two of the switches 130 are not connected to the second one of three adjacent conductive lines and are respectively connected to the first one and the third one of the three adjacent conductive lines. The first portions 110a in the conductive lines 110-1, 110-2, 110-3, 110-4, and 110-5, the conductive lines 120-1, 120-2, 120-3, 120-4, and 120-5 intersecting the conductive lines 110-1, 110-2, 110-3, 110-4, and 110-5, and the second portions in the corresponding light-shielding layer BM are used to reduce a light-shielding region, thereby increasing an area for a pixel electrode to increase aperture ratios of some sub-pixels.

The present invention has been disclosed through embodiments, but is not intended to be limited thereto. Various variations and modifications may be made by persons skilled in the art of the present invention without departing from the spirit and scope of the present invention. Therefore, the protection scope of the present invention should be as defined by the patent claims of the application.

What is claimed is:

1. A display panel, comprising:
an array substrate, comprising:
a first scan line, a second scan line, and a third scan line, sequentially and consecutively arranged along a first direction;
a first data line, a second data line, and a third data line, sequentially and consecutively arranged along a second direction and intersecting the first scan line, the second scan line, and the third scan line; and
four switches, wherein
two of the switches are connected to the second scan line being located between the two of the switches and are substantially located between the first data line and the second data line; and
the other two of the switches are not connected to the second scan line, are located between the first scan line and the third scan line, and are substantially located between the second data line and the third data line; and
a light-shielding structure, comprising:
a first light-shielding pattern, having a plurality of first portions and a plurality of second portions that are alternately arranged along a direction, wherein one of the first portions has a first width, one of the second portions has a second width, and the first width is greater than the second width, wherein one of the first portions corresponds to and substantially overlaps the two of the switches, and one of the second portions is connected to the one of the first portions and does not correspond to and does not overlap the switches, and wherein the second width is 50% to 70% of the first width.

2. A display panel, comprising:
an array substrate, comprising:
a first scan line, a second scan line, and a third scan line, sequentially and consecutively arranged along a first direction;
a first data line, a second data line, and a third data line, sequentially and consecutively arranged along a second direction and intersecting the first scan line, the second scan line, and the third scan line;
four switches; and
four pixel electrodes, adjacent to each other, and respectively connected to the corresponding four switches, wherein
a first minimum distance between two of the pixel electrodes is shorter than a second minimum distance between the other two of the pixel electrodes;
the first minimum distance is 50% to 70% of the second minimum distance; and
two of the switches are connected to the second scan line being located between the two of the switches and are substantially located between the first data line and the second data line, a gate of each of the two of the switches being located entirely between the other two of the pixel electrodes, and the other two of the switches are not connected to the second scan line and are substantially located between the second data line and the third data line.

3. The display panel according to claim 2, further comprising a light-shielding structure, comprising:
a first light-shielding pattern, having a plurality of first portions and a plurality of second portions that are alternately arranged along the direction, wherein:
one of the first portions has a first width, one of the second portions has a second width, the first width is greater than the second width, the one of the first portions corresponds to and substantially overlaps the two of the switches, the one of the second portions is connected to the first portion and does not correspond to and does not overlap the switches, and the second width is 40% to 60% of the first width.

\* \* \* \* \*